United States Patent [19]

Kennedy et al.

[11] Patent Number: 5,051,383

[45] Date of Patent: * Sep. 24, 1991

[54] METHOD FOR PRODUCING SELF-SUPPORTING CERAMIC BODIES WITH GRADED PROPERTIES

[75] Inventors: Christopher R. Kennedy; Andrew W. Urquhart, both of Newark, Del.; Danny R. White, Elkton, Md.; Marc S. Newkirk; Jeffrey R. Ramberg, both of Newark, Del.

[73] Assignee: Lanxide Technology Company, LP, Newark, Del.

[*] Notice: The portion of the term of this patent subsequent to Nov. 21, 2006 has been disclaimed.

[21] Appl. No.: 327,296

[22] Filed: Mar. 22, 1989

Related U.S. Application Data

[63] Continuation-in-part of Ser. No. 907,928, Sep. 16, 1986, Pat. No. 4,882,306.

[51] Int. Cl.$^5$ ............................................. C04B 35/10
[52] U.S. Cl. ..................................... 501/127; 501/96; 501/102; 501/128; 501/133; 501/134; 501/152; 264/65
[58] Field of Search ...................... 501/87, 88, 98, 127, 501/128, 153; 423/625; 264/65, 66

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 6/1964 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,770,488 | 11/1973 | Pepper et al. | |
| 3,789,096 | 1/1974 | Church | 264/60 |
| 3,864,154 | 2/1975 | Gazza et al. | 29/123 B |
| 3,973,977 | 8/1976 | Wilson | 106/62 |
| 4,822,306 | 11/1989 | Kennedy et al. | 501/87 |

FOREIGN PATENT DOCUMENTS

| | | |
|---|---|---|
| 0116809 | 8/1984 | European Pat. Off. |
| 0155831 | 9/1985 | European Pat. Off. |
| 0169067 | 1/1986 | European Pat. Off. |

OTHER PUBLICATIONS

"Oxidation of Molten Aluminum Alloys, Reaction with Refractories"-M. Drouzy and M. Richard-Mar. 1974, Fonderie, France No. 332, pp. 121-128.
"Refractories for Aluminum Alloy Melting Furnaces'-'-B. Clavaud and V. Jost-Sep., 1980-Lillian Brassings (from French), Jan., 1985.

Primary Examiner—William R. Dixon, Jr.
Assistant Examiner—Chris Gallo
Attorney, Agent, or Firm—Mark G. Mortenson; Carol A. Lewis; Michael K. Boyer

[57] ABSTRACT

In a method for producing ceramic body by oxidation of a parent metal having a graded microstructure characterized by a plurality of zones differing from each other in one or more properties by altering the process conditions during formation of said ceramic body such that a zone of the oxidation reaction product formed posterior to said altering has one or more properties different from a zone of the oxidation reaction product formed anterior to said altering.

18 Claims, 1 Drawing Sheet

METHOD FOR PRODUCING SELF-SUPPORTING CERAMIC BODIES WITH GRADED PROPERTIES

FIELD OF THE INVENTION

This application is a continuation-in-part of now allowed U.S. application Ser. No. 907,928, filed Sept. 16, 1986, now U.S. Pat. No. 4,882,306, in the names of Christopher R. Kennedy et al., the contents of which are expressly incorporated herein by reference.

This invention relates to a method for producing a self-supporting ceramic body having a plurality of zones which differ from each other in at least one property. The self-supporting body is produced by the oxidation of a molten parent metal with an oxidant. This invention also relates to novel articles produced by the disclosed method.

BACKGROUND OF THE INVENTION

In recent years there has been an increasing interest in substituting ceramics for metals because, with respect to certain properties, ceramics are superior to metals. There are, however, several known limitations or difficulties in making this substitution such as scaling versatility, capability to produce complex shapes, satisfying the properties required for the end-use application, and costs. Many of these limitations or difficulties have been overcome by the inventions disclosed in patent applications assigned to the same assignee as this application and discussed in the subsequent section, which provide novel methods for reliably producing ceramic materials, including shaped composites.

DESCRIPTION OF COMMONLY OWNED PATENT APPLICATIONS

The following commonly owned patent applications describe novel methods for producing a self-supporting ceramic body by oxidation of a parent metal to form a polycrystalline material comprising an oxidation reaction product and, optionally, metallic constituents:

(A) Ser. No. 818,943, filed Jan. 15, 1986, now U.S. Pat. No. 4,713,360, which is a continuation-in-part of Ser. No. 776,964, filed Sept. 17, 1985, which is a continuation-in-part of Ser. No. 705,787 filed Feb. 26, 1985, which is a continuation-in-part of U.S. application Ser. No. 591,392 filed Mar. 16, 1984, all in the names of Marc S. Newkirk et al and entitled "Novel Ceramic Materials and Methods for Making the Same";

(B) Ser. No. 822,999, filed Jan. 27, 1986, which is a continuation-in-part of Ser. No. 776,965, filed Sept. 17, 1985, which is a continuation-in-part of Ser. No. 747,788, filed June 25, 1985, which is a continuation-in-part of Ser. No. 632,636, filed July 20, 1984, all in the names of Marc S. Newkirk et al and entitled "Methods of Making Self-Supporting Ceramic Materials";

(C) Ser. No. 819,397, filed Jan. 17, 1986, now allowed, which is a continuation-in-part of Ser. No. 697,876, filed Feb. 4, 1985, both in the names of Marc S. Newkirk et al and entitled "Composite Ceramic Articles and Methods of Making Same"; and (D) Ser. No. 168,798, filed Mar. 16, 1988, in the names of Robert C. Kanter et al. and entitled "Method for Producing Self-Supporting Ceramic Bodies with Altered Microstructures", which is a continuation-in-part of Ser. No. 908,453, filed Sept. 17, 1986, in the names of Robert C. Kantner et al., and entitled "Method for Producing Self-Supporting Ceramic Bodies with Refined Microstructures."

The entire disclosures of each of the aforesaid Commonly Owned Patent Applications are incorporated herein by reference.

As explained in these Commonly Owned Patent Applications, novel polycrystalline ceramic materials or polycrystalline ceramic composite materials are produced by the oxidation reaction between a parent metal and an oxidant, e.g., a vaporized or normally gaseous material, as an oxidizing atmosphere. The method is disclosed generically in the aforesaid Commonly Owned Patent Applications "A". In accordance with this generic process, a parent metal, e.g. aluminum, is heated to an elevated temperature above its melting point but below the melting point of the oxidation reaction product to form a body of molten parent metal which reacts upon contact with a vapor-phase oxidant to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional oxidation reaction product upon contact with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as, for example, non-oxidized constituents of the parent metal, and/or voids. In the case of an oxide as the oxidation reaction product, oxygen or gas mixtures containing oxygen (including air) are suitable oxidants, with air usually being preferred for obvious reasons of economy. However, oxidation is used in its broad sense in all of the Commonly Owned Patent Applications and in this application, and refers to the loss or sharing of electrons by a metal to an oxidant which may be one or more elements and/or compounds. Accordingly, elements other than oxygen, or compounds, may serve as the oxidant, as explained below in greater detail.

In certain cases, the parent metal may require the presence of one or more dopants in order to influence favorably or facilitate growth of the oxidation reaction product, and the dopants are provided as alloying constituents of the parent metal. For example, in the case of aluminum as the parent metal and air as the oxidant, dopants such as magnesium and silicon, to name but two of a larger class of dopant materials, are alloyed with aluminum and utilized as the parent metal. The resulting oxidation reaction product comprises alumina, typically alpha-alumina.

The aforesaid Commonly Owned Patent Applications "B" disclose a further development based on the discovery that appropriate growth conditions as described above, for parent metals requiring dopants, can be induced by applying one or more dopant materials to the surface or surfaces of the parent metal, thus avoiding the necessity of alloying the parent metal with dopant materials, e.g. metals such as magnesium, zinc and silicon, in the case where aluminum is the parent metal and air is the oxidant. With this improvement, it is feasible to use commercially available metals and alloys which otherwise would not contain or have appropriately doped compositions. This discovery is advantageous also in that ceramic growth can be achieved in one or more selected areas of the parent metal's surface rather than indiscriminately, thereby making the process more efficiently applied, for example, by doping only one surface, or only portion(s) of a surface, of a parent metal.

Novel ceramic composite structures and methods of making them are disclosed and claimed in the aforesaid Commonly Owned Patent Applications "C" which utilize the oxidation reaction to produce ceramic composite structures comprising a substantially inert filler infiltrated by the polycrystalline ceramic matrix. A parent metal positioned adjacent to a mass of permeable filler is heated to form a body of molten parent metal which is reacted with an oxidant, as described above, to form an oxidation reaction product. As the oxidation reaction product grows and infiltrates the adjacent filler material, molten parent metal is drawn through previously formed oxidation reaction product into the mass of filler and reacts with the oxidant to form additional oxidation reaction product at the surface of the previously formed product, as described above. The resulting growth of oxidation reaction product infiltrates or embeds the filler and results in the formation of a ceramic composite structure of a polycrystalline ceramic matrix embedding the filler.

As disclosed in Commonly Owned Patent Applications "D", a process modifier can be employed in conjunction with a parent metal in order to refine the microstructure of the resulting product in comparison with the product of an unmodified process. This refinement can effect improved properties such as fracture toughness.

The aforesaid Commonly Owned Patent Applications describe the production of oxidation reaction products readily "grown" to desired thicknesses heretofore believed to be difficult, if not impossible, to achieve with conventional ceramic processing techniques. The present invention provides as a further improvement a method for "growing" ceramic or ceramic composite bodies comprising a plurality of zones in intimate juxtaposition, which differ from each other in one or more properties such as composition or measurable performance, thus alleviating the need for post-processing to accomplish a cohesive heterogeneous ceramic or ceramic composite body.

SUMMARY OF THE INVENTION

The present invention provides a method for producing a self-supporting ceramic or ceramic composite structure, hereinafter referred to generally as a ceramic structure or a ceramic body, comprising a plurality of zones differing from each other in one or more properties, which zones each comprise the oxidation reaction product of a molten parent metal and an oxidant and, optionally, non-oxidized metallic constituents. Oxidant as used herein is intended to comprise one or more suitable electron acceptors or electron sharers and may be a solid, a liquid, or a gas or some combination of these (e.g., a solid and a gas) at the oxidation reaction conditions. For example, typical oxidants include, without limitation, oxygen, nitrogen, a halogen, sulphur, phosphorus, arsenic, carbon, boron, selenium, tellurium, and/or compounds and combinations thereof, for example, silica (as a source of oxygen), methane, ethane, propane, acetylene, ethylene, and propylene (as sources of carbon), and mixtures such as air, $H_2/H_2O$ and $CO/CO_2$ the latter two (i.e., $H_2/H_2O$ and $CO/CO_2$) being useful in reducing the oxygen activity of the environment. One or more process conditions are altered during formation of the ceramic structure such that the zone of oxidation reaction product formed posterior to altering the process condition(s) differs in one or more properties from at least one zone of oxidation reaction product formed anterior to said altering. The resulting product comprises a cohesive ceramic structure having a plurality of zones, each differing in properties. Generally, in accordance with the present invention, a parent metal is heated in the presence of an oxidant to a temperature above its melting point, but below the melting point of the oxidation reaction product to form a body of molten metal. At that temperature, or within that temperature range, the molten parent metal is reacted with an oxidant to form an oxidation reaction product, which product is maintained at least partially in contact with and extends between the body of molten metal and an oxidant. At that temperature, molten metal is continually transported into and through the previously formed oxidation reaction product, and into contact with an oxidant at the interface between previously formed oxidation reaction product and an oxidant, thereby forming a progressively thicker layer of oxidation reaction product. It has been discovered that by altering one or more of the process conditions during this progressive process, the oxidation reaction product formed posterior to that altering can differ in one or more properties from the oxidation reaction product formed prior to or anterior to the altering. Moreover, although the altering of process conditions produces a discontinuity in one or more properties of the oxidation reaction product, the structure of the ceramic remains cohesive. The resulting ceramic structure comprises one or more oxidation reaction products and, optionally, non-oxidized metallic constituents.

Altering of one or more process conditions may include (1) providing a second oxidant and substituting and/or mixing the original oxidant with the second oxidant, (2) providing a process modifier and conjoining it with the transported molten parent metal, or (3) increasing or decreasing the reaction temperature, or combinations of either (1), (2), or (3). The resulting ceramic structure is recovered having at least two zones of oxidation reaction product which differ from each other in one or more properties, and severally result from the respective oxidation reaction processes occurring anterior and posterior to the particular altering. In accordance with the present invention, the plurality of zones of oxidation reaction product may differ from one another in composition or measurable performance.

DETAILED DESCRIPTION OF THE INVENTION AND PREFERRED EMBODIMENTS

Figure 1:
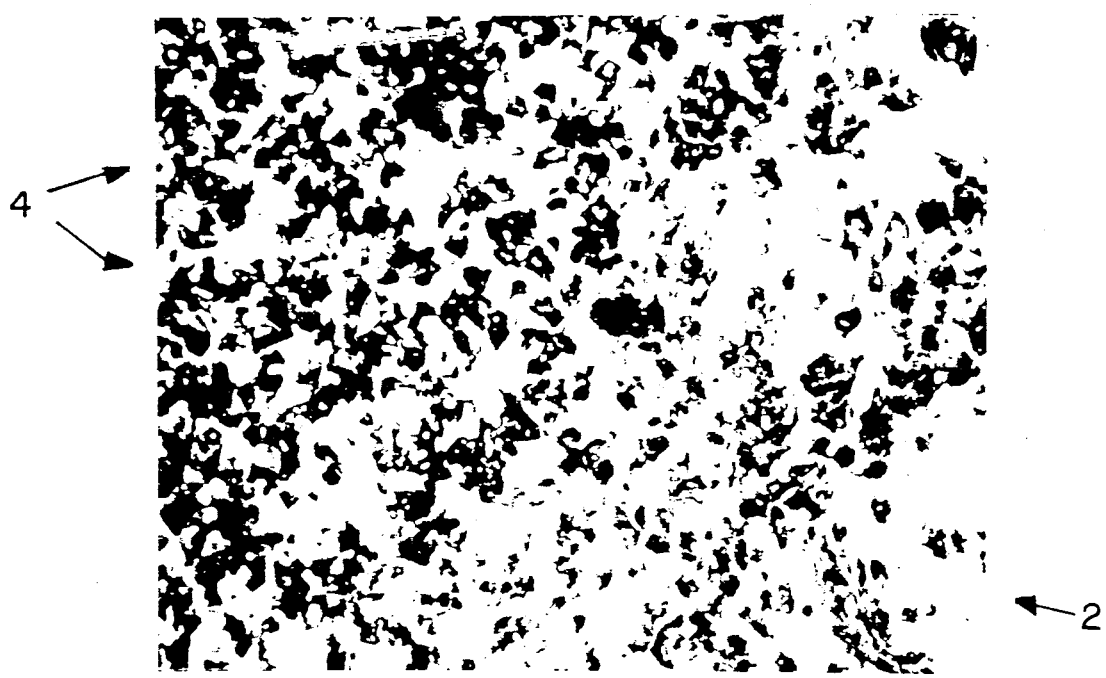
FIG. 1 is a photomicrograph of a section taken at 400× of a body produced according to Example 1.

In accordance with the present invention, the parent metal, which may be doped (as explained below in greater detail), and is the precursor to the oxidation reaction product, is formed into an ingot, billet, rod, plate, or the like; and is placed into a setup of an inert bed, crucible or other refractory container.

This setup is heated in the presence of an oxidant to a temperature above the melting point of the parent metal, but below the melting point of the oxidation reaction product to form a body of molten parent metal. At that temperature, the molten parent metal is reacted with an oxidant to form a layer of oxidation reaction product. However, in some cases wherein certain dopants are employed, e.g. magnesium as a dopant for an aluminum-silicon parent metal and where air is employed as oxidant, the formation of the oxidation reaction product may be preceded by the formation of a thin layer of spinel, e.g. magnesium aluminate spinel, which forms essentially all in an initiation layer.

At this temperature, or within this temperature range, molten metal is transported into and through the oxidation reaction product (as disclosed in the Commonly Owned Patent Applications), and towards an oxidant. Molten parent metal continues to react with an oxidant at the interface between the previously formed oxidation reaction product and the oxidant, thereby forming a progressively thicker layer of oxidation reaction product.

It has been discovered that one or more process conditions can be changed or altered during this progressive process such that the oxidation reaction product (i.e., ceramic or ceramic composite body) formed after or as a result of that altering differs in one or more properties from the oxidation reaction product formed prior to the altering. The property or properties may differ in composition, such as nitride versus oxide, or in measurable performance, such as hardness or fracture toughness, or in metallographic characteristics of the microstructure. One or more properties can be altered in accordance herewith one time, or a series of times. The resulting cohesive ceramic structure comprises at least two zones, each comprising the oxidation reaction product of the parent metal and an oxidant.

Altering of process conditions can be accomplished by any one of several means or combination of means. Altering can include (1) providing a second oxidant by substituting one oxidant for another, (2) mixing the original oxidant with the second oxidant, (3) simultaneously providing two different oxidants at two different physical locations, (4) providing one or more process modifiers and conjoining the parent metal with the process modifier to produce a refined microstructure, or (5) increasing or decreasing the reaction temperature, or combinations of (1), (2), (4) or (5).

The reaction temperature may be altered by exposing the ceramic or ceramic composite structure to a temperature gradient during oxidation reaction product growth. For example, at least a portion of a growing oxidation reaction product may be exposed to a temperature which is higher or lower than another portion of the growing oxidation reaction product (e.g., exposing one portion of the growing oxidation reaction product to temperature $T_1$ and another to temperature $T_2$, wherein $T_1$ and $T_2$ are not equal). By utilizing a temperature gradient during the oxidation reaction product growth, it is possible to, for example, form a ceramic or ceramic composite body characterized by a graded ceramic to metal ratio. For example, as the temperature utilized to form the oxidation reaction product increases, the ceramic to metal ratio increases, whereas the opposite effect occurs for a decreased oxidation reaction temperature.

Alternatively, it is possible to alter or to modify the ceramic structure by changing sequentially the processing temperature to which the entire oxidation reaction process is exposed. Moreover, the present invention includes combining the process conditions which may be altered or modified. For example, a temperature gradient, as discussed above, may be utilized while substituting and/or mixing the oxidant(s) which are reacted with a parent metal.

In accordance with one embodiment of the present invention, a source of a second vapor-phase oxidant is provided to accomplish the altering. The oxidation reaction between the molten parent metal and the original vapor-phase oxidant is continued for a time sufficient to develop a layer or zone comprising the oxidation reaction product of the parent metal and original vapor-phase oxidant and non-oxidized metallic constituents. The original vapor-phase oxidant is then replaced with the second vapor-phase oxidant, and the oxidation of the molten parent metal is continued by the second vapor-phase oxidant. This reaction is continued for a time sufficient to develop a zone of oxidation reaction product of the molten parent metal and second vapor-phase oxidant of desired thickness. The ceramic body is thus comprised of a cohesive combination of the respective oxidation reaction products. For example, an aluminum parent metal can be first reacted with air to form alumina. The process then can be altered to provide a nitrogen gas, and aluminum nitride is then formed. The process conditions can be reversed. The resulting ceramic body comprises a cohesive monolith.

In accordance with another embodiment of the present invention, the altering comprises the conjunction of a process modifier (as disclosed in Commonly Owned Patent Application "D") with the parent metal. For example, when employing an aluminum parent metal and air as oxidant, suitable modifiers include nickel, iron, cobalt, zirconium, titanium, niobium, copper and chromium. The modifier preferably is in powder or particulate form and dispersed over, or contacted with, one or more surfaces of the parent metal or the developing ceramic body. The unmodified oxidation reaction process is continued for a time sufficient to develop a layer or zone, comprising the oxidation reaction product of the unmodified reaction, of desired thickness. A suitable quantity of a process modifier is then conjoined with the parent metal, and the subsequent oxidation reaction process is modified producing a ceramic microstructure which is refined relative to that formed prior to the conjunction. This modified process is continued for a time sufficient to develop a zone of refined oxidation reaction product of desired thickness. The ceramic body is thus comprised of a cohesive combination of different microstructures.

It should be understood, in accordance with the present invention, that in some cases the particular altered process conditions resulting from the particular altering means chosen may degrade or degenerate the initial zone or one or more prior zones of oxidation reaction product. For example, certain oxidation conditions will substantially degrade certain oxidation reaction products. Therefore, care must be taken to ensure that oxidation reaction conditions effected will be compatible with the zone or zones of oxidation reaction product formed anterior to the particular altering. Additionally, since the oxidation reactions of the present invention are carried out at high temperatures, care should be taken in designing a particular system to account or provide for differences in thermal expansion coefficients between juxtaposed or adjacent zones of separate oxidation reaction products. The extreme difference in thermal expansion between zones may result in cracking of one zone. However, certain thermal expansion mismatches between adjacent zones can provide an inherent prestress on the ceramic body, as in placing an interior zone of oxidation reaction product into compression by forming a zone of oxidation reaction product around it which has a greater thermal expansion coefficient. Such prestresses can in certain end-use employment result in improved performance of an end product.

As described in the Commonly Owned Patent Applications, a filler material as a loose mass (or being shaped into a preform) may be utilized to form a ceramic composite article. A ceramic composite body, being characterized by a graded microstructure, may be formed by utilizing different filler materials. Different filler materials are herein defined as comprising fillers which are distinct in at least one characteristic such as size, composition, etc. The different filler materials are provided in a manner sufficient to affect at least one property of the final ceramic composite body (e.g., mechanical strength, thermal expansion, etc.). Further, it may be desired to tailor the properties of the ceramic composite by controlling the position of a particular filler material (e.g., a composition or size gradient of the filler within a cross-section to be embedded by the oxidation reaction product). Accordingly, the present invention permits formation of a tailored ceramic or ceramic composite body having a graded microstructure due to controlling the characteristics of the filler materials.

In an embodiment of the invention, it is possible to tailor the properties of the ceramic or ceramic composite body by utilizing differing oxidants. Particularly, a solid, liquid, or vapor-phase oxidant, or a combination of such oxidants, may be employed. For example, typical oxidants include, without limitation, oxygen, nitrogen, a halogen, sulphur, phosphorus, arsenic, boron, selenium, tellurium, and/or compounds and combinations thereof, for example, silica (as a source of oxygen), methane, ethane, propane, acetylene, ethylene, and propylene (as sources of carbon), and mixtures such as air, $H_2/H_2O$ and $CO/CO_2$ the latter two (i.e., $H_2/H_2O$ and $CO/CO_2$) being useful in reducing the oxygen activity of the environment. Accordingly, at least a portion of the ceramic structure of the invention may comprise an oxidation reaction product comprising one or more of oxides, nitrides, carbides, borides and oxynitrides. More specifically, the oxidation reaction product may, for example, be one or more of aluminum oxide, aluminum nitride, silicon carbide, silicon boride, aluminum boride, titanium nitride, zirconium nitride, titanium boride, zirconium boride, titanium carbide, zirconium carbide, silicon nitride, hafnium boride and tin oxide. Although the oxidation reaction is usually described as employing a vapor-phase oxidant, either alone or in conjunction with an oxidant which is a solid or liquid under the process conditions, it should be understood that the utilization of a vapor-phase oxidant is not necessary to produce the ceramic matrix composite body. When a vapor-phase oxidant is not employed and an oxidant which is a solid or liquid under the process conditions is used, the preform need not be permeable to the surrounding atmosphere. However, the preform should still be sufficiently permeable to accommodate the development or growth of the oxidation reaction product as a matrix within the preform without substantially disturbing, upsetting, or otherwise altering the configuration or geometry of the preform.

The use of solid or liquid oxidants may create an environment within the preform more favorable to the oxidation kinetics of the parent metal than the environment outside the preform. This enhanced environment is beneficial in promoting ceramic matrix development within the preform to the boundary and minimizing overgrowth. When a solid oxidant is employed, it may be dispersed through the entire preform or through a portion of the preform adjacent to the parent metal, such as in particulate form and admixed with the preform, or it may be utilized as coatings on the particles comprising the preform. Suitable solid oxidants may include suitable elements, such as boron or carbon, or suitable reducible compounds, such as silicon dioxide (as a source of oxygen) or certain borides of lower thermodynamic stability than the boride reaction product of the parent metal.

If a liquid oxidant is employed, the liquid oxidant may be dispersed throughout the entire preform or a portion thereof adjacent to the molten parent metal. Reference to a liquid oxidant means one which is a liquid under the oxidation reaction conditions, and so a liquid oxidant may have a solid precursor, such as a salt, which is molten or liquid at the oxidation reaction conditions. Alternatively, the liquid oxidant may be a liquid precursor, e.g. a solution of a material, which is used to coat and/or impregnate part or all of the porous surfaces of the preform and which is melted or decomposed at the process conditions to provide a suitable oxidant moiety. Examples of liquid oxidants as herein defined include low melting glasses.

Moreover, the present invention permits utilizing a combination, mixture, etc., of solid, liquid, and/or vapor-phase oxidants. In one embodiment, a solid oxidant may be distributed in at least a portion of a filler material which is to be infiltrated, at least initially, by growth of an oxidation reaction product, said oxidation reaction product being formed by a reaction between a vapor-phase oxidant and a parent metal. However, as parent metal and oxidation reaction product begin to be exposed to and react with the second solid and/or liquid oxidant, the oxidation reaction product which is then formed may be modified relative to the first formed oxidation reaction product. Further, a solid, liquid, or vapor oxidant may react with residual parent metal contained in the oxidation reaction product. Still further, different oxidants may be provided simultaneously (e.g., at different physical locations) to the growing oxidation reaction product, thereby resulting in a graded structure in the formed ceramic or ceramic composite body.

As explained in the Commonly Owned Patent Applications, dopant materials, used in conjunction with the parent metal favorably influence the oxidation reaction process, particularly in systems employing aluminum as the parent metal. Therefore, in some cases a dopant material will need to be used in addition to the modifier. The dopant or dopants used in conjunction or in association with the parent metal (1) may be provided as alloying constituents of the parent metal, (2) may be applied to at least a portion of the surface of the parent metal, or (3) may be applied to or incorporated into part or all of the filler material or preform, or any combination of two or more of techniques (1), (2), or (3) may be employed. For example, an alloyed dopant may be used solely or in combination with a second externally applied dopant. In the case of technique (3), wherein additional dopant or dopants are applied to the filler material, the application may be accomplished in any suitable manner as explained in the Commonly Owned Patent Applications.

The function or functions of a particular dopant material can depend upon a number of factors. Such factors include, for example, the particular combination of dopants when two or more dopants are used, the use of an externally applied dopant in combination with a dopant alloyed with the precursor metal, the concentration of dopant employed, the oxidizing environment, process conditions, and as stated above, the identity and concentration of the modifier metal present.

Dopants useful for an aluminum parent metal, particularly when, for purposes of economy, air is utilized as the oxidant, include magnesium, zinc, and silicon, either alone or in combination with other dopants, as described below. These metals, or a suitable source of the metals, may be alloyed into the aluminum-based parent metal at concentrations for each of between about 0.1-10% by weight based on the total weight of the resulting doped metal. These dopant materials or a suitable source thereof (e.g. MgO, ZnO, or $SiO_2$) may be used externally to the parent metal. Thus an alumina ceramic structure is achievable for an aluminum-silicon parent metal using air as the oxidant by using MgO as a dopant in an amount greater than about 0.0008 gram per gram of parent metal to be oxidized and greater than 0.003 gram per square centimeter of parent metal upon which the MgO is applied. However, the concentration of dopant needed, as discussed above, may depend upon the identity, presence, and concentration of a modifier metal.

Additional examples of dopant materials for aluminum parent metal include sodium, germanium, tin, lead, lithium, calcium, boron, phosphorus, and yttrium which may be used individually or in combination with one or more dopants depending on the oxidant, identity and quantity of modifier metal present and process conditions. Rare earth elements such as cerium, lanthanum, praseodymium, neodymium, and samarium are also useful dopants, and herein again especially when used in combination with other dopants. All of the dopant materials, as explained in the Commonly Owned Patent Applications, are effective in promoting polycrystalline oxidation reaction product growth for the aluminum-based parent metal systems. Moreover, as discussed in the Commonly Owned Patent Applications, metals and alloys other than aluminum may be utilized as parent metals (e.g., titanium, zirconium, etc.).

In order to understand better the manner in which the present invention may be conducted, the following example of the present invention is provided. This example is intended to be illustrative only of an aspect of the manufacture of a ceramic body having a graded microstructure. Particularly, the example should not be construed as limiting the scope of the invention.

EXAMPLE 1

A cohesive ceramic structure comprising a zone of alumina and a zone of aluminum nitride was fabricated in accordance with the present invention by altering the composition of the valor-phase oxidant during formation of the ceramic structure.

A cylindrical ingot of aluminum alloy from Belmont Metals Inc. having the composition shown in Table A and measuring 1 inch in diameter and ½ inch tall, was placed into a bed of alumina particles, contained in a refractory crucible, such that one circular face of the ingot was exposed to the atmosphere and substantially flush with the bed. This setup was placed into an induction furnace with a controlled atmosphere. The ingot was heated in flowing oxygen (400 cc/min) to a surface temperature of 1000.C (optical pyrometer measurement) over 1 hour. The oxidation in oxygen was carried out under the aforementioned conditions for 7 hours. The atmosphere supply was then switched to forming gas comprising 96% nitrogen and 4% hydrogen, and the oxidation was continued for 5 hours in forming gas. The resulting ceramic body was recovered and cross-sectioned to reveal a cohesive structure comprising adjacent zones. X-ray diffraction analysis of the separate zones confirmed alumina as the first zone and aluminum nitride as the posterior zone. FIG. 1 is a photomicrograph at 200× magnification showing the zone of alumina 2 and the zone of aluminum nitride 4 with no discontinuity in physical microstructure.

TABLE A

| Aluminum Parent Metal Alloy Composition (Nominal) | |
| --- | --- |
| 3.7% | zinc |
| 3.9% | copper |
| 1.1% | iron |
| 8.3% | silicon |
| 0.19% | magnesium |
| 0.04% | nickel |
| 0.02% | tin |
| 0.04% | chromium |
| 0.20% | manganese |
| 0.08% | titanium |
| Balance | aluminum |

While the present invention has been disclosed in the preferred embodiments, it is to be understood that the invention is not limited to the precise disclosure contained herein but may otherwise be embodied with various changes, modifications and improvements which may occur to those skilled in the art without departing from the scope of the invention as defined in the appended claims.

What is claimed is:

1. A method for producing a self-supporting ceramic body by oxidation of a parent metal to form an oxidation reaction product, said ceramic body having a microstructure characterized by at least two zones which differ from each other in at least one property, which method comprises the steps of: (a) heating said parent metal in the presence of a first oxidant to form a body of molten metal and reacting said molten metal with said oxidant at a temperature above the melting point of said parent metal but below the melting point of said oxidation reaction products to form said oxidation reaction product, which product is in contact with and extends between said body of molten metal and said first oxidant, (b) at said temperature, transporting said molten metal through said oxidation reaction product towards said first oxidant so that fresh oxidation reaction product continues to form at the interface between said first oxidant and previously formed oxidation reaction product thereby forming a progressively thicker body of oxidation reaction product, (c) altering a process condition during formation of said ceramic body such that said altering is sufficient to form at least two different zones of oxidation reaction product which differ from each other in at least one property, (d) continuing said reaction for a time sufficient to produce said ceramic body, and (e) recovering the resulting ceramic body.

2. A method for producing a self-supporting ceramic composite body by oxidation of a parent metal to form an oxidation reaction product, said ceramic composite body having a microstructure characterized by at least two zones which differ from each other in at least one property, which method comprises the steps of: (a), orienting at least one filler material adjacent to said parent metal, (b) heating said parent metal in the presence of a first oxidant to form a body of molten metal and reacting said molten metal with said oxidant at a temperature above the melting point of said parent metal but below the melting point of said oxidation reaction product to form said oxidation reaction product, which product is in contact with and extends between said body of molten metal and said first oxidant, (c) at said temperature, transporting said molten metal through said oxidation reaction product towards said first oxidant so that fresh oxidation reaction product continues to form at the interface between said first oxidant and previously formed oxidation reaction product thereby forming a progressively thicker body of oxidation reaction product which embeds at least a portion of said at least one filler material, (d) altering a process condition during formation of said ceramic composite body such that said altering is sufficient to form at least two different zones of oxidation reaction product which differs from each other in at least one property, (e) continuing said reaction for a time sufficient to produce said ceramic composite body, and (f) recovering the resulting ceramic composite body.

3. The method of claim 1 or claim 2, wherein said altering comprises providing a source of a second oxidant which substantially replaces said first oxidant and reacting said parent metal with said second oxidant to form a zone comprising the oxidation reaction product of said parent metal and said second oxidant.

4. The method of claim 1 or claim 2, including providing a source of a process modifier, wherein said altering comprises conjoining said parent metal with said modifier and continuing said oxidation reaction to form a zone comprising the oxidation reaction product of said parent metal and said oxidant having a microstructure which is refined compared with the oxidation reaction product formed without said altering.

5. The method of any of claims 1 or 2, wherein said parent metal comprises at least one material selected from the group consisting of: aluminum, titanium, zirconium, hafnium, silicon, tin and mixtures and alloys thereof.

6. The method of claim 1 or claim 2, wherein said first and second oxidants comprise at least one material selected from the group consisting of a solid oxidant, a liquid oxidant, and a vapor-phase oxidant and precursors thereof.

7. The method of claim 2, wherein said altering comprises providing at least two different filler materials.

8. The method of claim 7, wherein said at least two different filler materials differ from each other in at least one property selected from the group consisting of size and chemical composition, such that the formed ceramic composite body comprises said at least two different zones.

9. The method of claim 2, wherein said altering comprises providing a temperature gradient during formation of the oxidation reaction product, such that the formed ceramic composite body comprises said at least two different zones.

10. The method of claim 2, wherein said altering comprises providing at least two different oxidants during formation of the oxidation reaction product, such that the formed ceramic composite body comprises said at least two different zones.

11. The method of claim 1, wherein said altering comprises providing at least two different oxidants during formation of the oxidation reaction product, such that the formed ceramic body comprises said at least two different zones.

12. The method of claim 10 or claim 11, wherein said at least two different oxidants are provided simultaneously.

13. The method of claim 10, wherein said at least two different oxidants comprise at least two materials selected from the group consisting of solid oxidants, liquid oxidants and vapor-phase oxidants.

14. The method of claim 11, wherein said at least two different oxidants comprise at least two materials selected from the group consisting of solid oxidants, liquid oxidants and vapor-phase oxidants.

15. The method of claim 5, wherein said parent metal comprises aluminum.

16. The method of claim 1, wherein said altering comprises providing a temperature gradient during formation of the oxidation reaction product, such that the formed ceramic body comprises said at least two different zones.

17. The method of claim 1, wherein said altering comprises changing sequentially the processing temperature during formation of the oxidation reaction product.

18. The method of claim 2, wherein said altering comprises changing sequentially the processing temperature during formation of the oxidation reaction product.

* * * * *